United States Patent
Wen et al.

(10) Patent No.: US 11,940,721 B2
(45) Date of Patent: Mar. 26, 2024

(54) PROJECTION DISPLAY DEVICE AND PROJECTION DISPLAY EQUIPMENT

(71) Applicant: Shenzhen China Star Optoelectronics Semiconductor Display Technology Co., Ltd., Shenzhen (CN)

(72) Inventors: Lei Wen, Shenzhen (CN); Zhiqing Shi, Shenzhen (CN); Miao Jiang, Shenzhen (CN); Jiangbo Yao, Shenzhen (CN); Lixuan Chen, Shenzhen (CN); Xin Zhang, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/969,564

(22) PCT Filed: May 15, 2020

(86) PCT No.: PCT/CN2020/090501
§ 371 (c)(1),
(2) Date: Aug. 13, 2020

(87) PCT Pub. No.: WO2021/217736
PCT Pub. Date: Nov. 4, 2021

(65) Prior Publication Data
US 2023/0129293 A1    Apr. 27, 2023

(30) Foreign Application Priority Data

Apr. 29, 2020  (CN) .......................... 202010359141.8

(51) Int. Cl.
G03B 21/604 (2014.01)
G02F 1/1333 (2006.01)
(Continued)

(52) U.S. Cl.
CPC ......... *G03B 21/604* (2013.01); *H04N 9/3194* (2013.01); *G02F 1/133365* (2013.01); *G02F 1/133528* (2013.01)

(58) Field of Classification Search
None
See application file for complete search history.

(56) References Cited

U.S. PATENT DOCUMENTS

2001/0028501 A1* 10/2001 Hunter ................... G03B 21/56
                                                                     359/449
2007/0024954 A1    2/2007 Sakamoto
(Continued)

FOREIGN PATENT DOCUMENTS

CN         1432906 A     7/2003
CN       101751188 A     6/2010
(Continued)

*Primary Examiner* — Bao-Luan Q Le
*Assistant Examiner* — Danell L Owens
(74) *Attorney, Agent, or Firm* — Nathan & Associates; Menachem Nathan

(57) ABSTRACT

A projection display device and a projection display equipment are provided. The projection display device includes a display screen body, a photosensitive device, and a control module. The control module is electrically connected to the display screen body, the photosensitive device outputs a photosensitive signal when sensing a projection light beam, and the control module is electrically connected to the photosensitive device to receive the photosensitive signal and to control a section on the display screen body corresponding to a projection position of the projection light beam to be converted from a transparent state to an opaque state according to the photosensitive signal.

15 Claims, 7 Drawing Sheets

(51) Int. Cl.
*G02F 1/1335* (2006.01)
*H04N 9/31* (2006.01)

(56) References Cited

U.S. PATENT DOCUMENTS

2010/0110385 A1  5/2010  Choi et al.
2012/0224388 A1  9/2012  Lin

FOREIGN PATENT DOCUMENTS

| | | | | |
|---|---|---|---|---|
| CN | 201583927 U | | 9/2010 | |
| CN | 104345539 A | * | 2/2015 | ........... G03B 21/132 |
| CN | 104345539 A | | 2/2015 | |
| CN | 110286509 A | | 9/2019 | |
| CN | 110456540 A | | 11/2019 | |
| CN | 209707815 U | * | 11/2019 | |
| JP | 2007041169 A | | 2/2007 | |

* cited by examiner

PROJECTION DISPLAY DEVICE AND PROJECTION DISPLAY EQUIPMENT

FIELD OF INVENTION

The present disclosure relates to the field of display technologies, and more particularly, to a projection display device and a projection display equipment.

BACKGROUND OF INVENTION

With improvement of display technologies, people not only have higher requirements for display quality, but also have more demands for expansion of display scenes. At present, the industry provides a new projection display equipment using transparent glass as a projection wall. The projection wall is used as glass when it is not necessary to perform projection display, and when it is necessary to perform projection display, a projection equipment will project images to be displayed to the projection wall, using surface reflection of the transparent glass to form images.

However, because the transparent glass itself is transparent, other than a part of reflected light, most of light projected on the transparent glass will pass through the transparent glass and will not enter people's eyes, thereby causing poorer clarity and brightness of images displayed on the projection wall.

Technical problem: in current projection walls which use transparent glass, other than a part of reflected light, most of light projected on the transparent glass will pass through the transparent glass and will not enter people's eyes, thereby causing poorer clarity and brightness of images displayed on the projection wall.

SUMMARY OF INVENTION

In a first aspect, an embodiment of the present disclosure provides a projection display device which comprises: an image displaying part including a display screen body and a photosensitive device configured to sense a projection light beam projected on the projection display device, wherein the photosensitive device outputs a photosensitive signal when sensing the projection light beam;
    a control module electrically connected to the display screen body and the photosensitive device to receive the photosensitive signal, and to determine a projection position of the projection light beam on the projection display device and control a section of the display screen body corresponding to the projection position to be converted from a transparent state to an opaque state according to the photosensitive signal.

In some embodiments, the display screen body comprises a first transparent substrate and a second transparent substrate disposed opposite to the first transparent substrate, a switch device layer and a first electrode are stacked on one side of the first transparent substrate adjacent to the second transparent substrate in sequence, a second electrode is disposed on one side of the second transparent substrate adjacent to the first transparent substrate, and a liquid crystal layer is disposed between the first electrode and the second electrode;
    wherein the switch device layer comprises a switch device electrically connected to the first electrode, and the control module is electrically connected to the switch device and controls the switch device to be turned on when receiving the photosensitive signal.

In some embodiments, photosensitivity of the photosensitive device is less than a default value.

In some embodiments, the projection display device further comprises a transparent glass part connected to the image displaying part.

In some embodiments, the image displaying part is integrally formed with the transparent glass part.

In some embodiments, the image displaying part is embedded in the transparent glass part.

In a second aspect, an embodiment of the present disclosure further provides a projection display equipment which comprises a projector and a projection display device. The projection display device comprises:
    an image displaying part including a display screen body and a photosensitive device configured to sense a projection light beam projected on the image displaying part, wherein the photosensitive device outputs a photosensitive signal when sensing the projection light beam;
    wherein the image displaying part further comprises a control module electrically connected to the display screen body and the photosensitive device to receive the photosensitive signal, and to determine a projection position of the projection light beam on the image displaying part and control a section of the display screen body corresponding to the projection position to be converted from a transparent state to an opaque state according to the photosensitive signal.

In some embodiments, the display screen body comprises a first transparent substrate and a second transparent substrate disposed opposite to the first transparent substrate, a switch device layer and a first electrode are stacked on one side of the first transparent substrate adjacent to the second transparent substrate in sequence, a second electrode is disposed on one side of the second transparent substrate adjacent to the first transparent substrate, and a liquid crystal layer is disposed between the first electrode and the second electrode;
    wherein the switch device layer comprises a switch device electrically connected to the first electrode, and the control module is electrically connected to the switch device and controls the switch device to be turned on when receiving the photosensitive signal.

In some embodiments, the photosensitive device is disposed on one side of the liquid crystal layer adjacent to the projector.

In some embodiments, photosensitivity of the photosensitive device is less than a default value.

In some embodiments, the projection display device further comprises a transparent glass part connected to the image displaying part.

In some embodiments, the image displaying part is integrally formed with the transparent glass part.

In some embodiments, the image displaying part is embedded in the transparent glass part.

In a third aspect, an embodiment of the present disclosure further provides a projection display device which comprises: an image displaying part including a display screen body and a photosensitive device configured to sense a projection light beam projected on the projection display device, wherein the photosensitive device outputs a photosensitive signal when sensing the projection light beam; and
    a control module electrically connected to the display screen body and the photosensitive device to receive the photosensitive signal, and to determine a projection position of the projection light beam on the projection display device and control a section on the display screen body corresponding to the projection position to be converted from a transparent state to an opaque state according to the photosensitive signal; and a transparent glass part connected to the image displaying part, wherein a thickness of the image displaying part is less than or equal to a thickness of the transparent glass part.

In some embodiments, the display screen body comprises a first transparent substrate and a second transparent substrate disposed opposite to the first transparent substrate, a switch device layer and a first electrode are stacked on one side of the first transparent substrate adjacent to the second transparent substrate in sequence, a second electrode is disposed on one side of the second transparent substrate adjacent to the first transparent substrate, and a liquid crystal layer is disposed between the first electrode and the second electrode;

wherein the switch device layer comprises a switch device electrically connected to the first electrode, and the control module is electrically connected to the switch device and controls the switch device to be turned on when receiving the photosensitive signal.

In some embodiments, photosensitivity of the photosensitive device is less than a default value.

In some embodiments, the image displaying part is integrally formed with the transparent glass part.

In some embodiments, the image displaying part is embedded in the transparent glass part.

In some embodiments, liquid crystals in the liquid crystal layer are polymer liquid crystals.

In some embodiments, a first polarizer is disposed on one side of the first transparent substrate away from the second transparent substrate, a second polarizer is disposed on one side of the second transparent substrate away from the first transparent substrate, and a polarization direction of the first polarizer is parallel to a polarization direction of the second polarizer.

Beneficial effect: a display screen body has a transparent state and an opaque state. When a photosensitive device does not sense a projection light beam, the display screen body presents a transparent state, and a projection display device can be directly used as transparent glass. When the projection light beam irradiates an image displaying part, the photosensitive device will sense the projection light beam, generate a photogenerated leakage current, and send the photogenerated leakage current to a control module as a photosensitive signal, and the control module controls a section on the display screen body corresponding to a projection position to be converted to an opaque state, which enhances light reflectivity of the section on the image displaying part corresponding to the projection position, thereby enhancing clarity and brightness of images displayed by the projection light beam on the projection display device.

DETAILED DESCRIPTION OF PREFERRED EMBODIMENTS

In order to make the purpose, technical solutions, and effects of the present disclosure clearer and more definite, the following further describes the present disclosure in detail with reference to the drawings and embodiments. It should be understood that the specific embodiments described herein are only used to explain the disclosure, and are not used to limit the disclosure.

In current projection walls which use transparent glass, other than a part of reflected light, most of light projected on the transparent glass will pass through the transparent glass and will not enter people's eyes, thereby causing technical problems of poorer clarity and brightness of images displayed on the projection wall. The present disclosure can solve the above problems.

Figure 1:
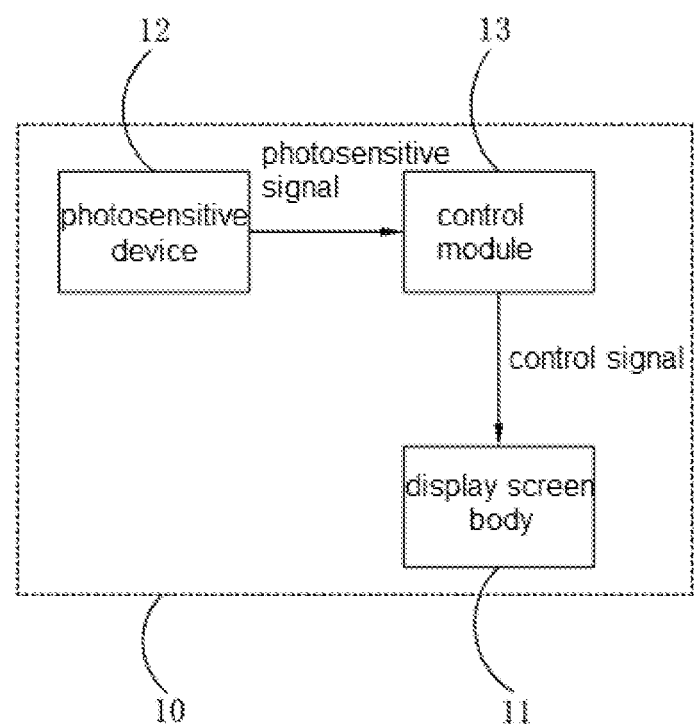
FIG. 1 is a schematic module composition diagram of a projection display device according to an embodiment of the present disclosure.
Figure 2:
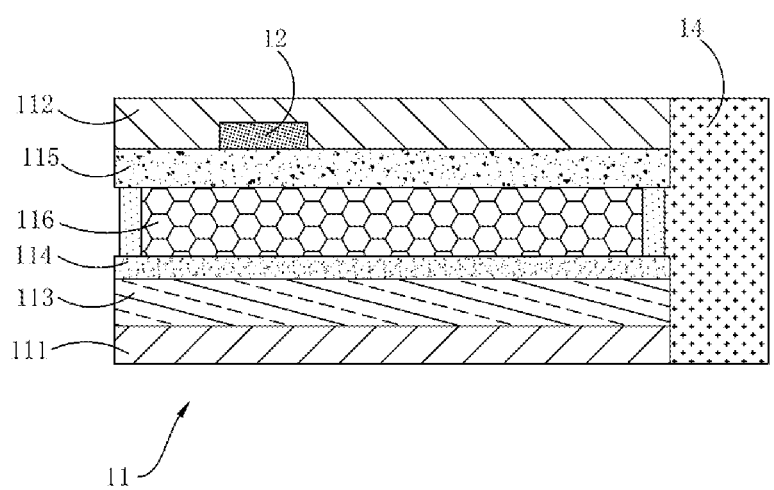
FIG. 2 is a schematic structural diagram of a projection display device according to an embodiment of the present disclosure.
Figure 3:
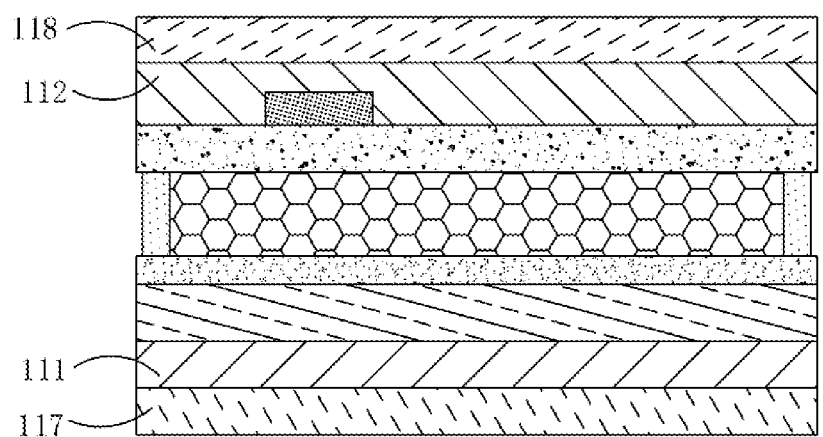
FIG. 3 is a schematic structural diagram of a projection display device according to another embodiment of the present disclosure.

A projection display device 10, as shown in FIGS. 1 and 2, comprises an image displaying part including a display screen body 11 and a photosensitive device 12 configured to sense a projection light beam projected on the image displaying part, and the photosensitive device 12 outputs a photosensitive signal when sensing the projection light beam.

Wherein, the photosensitive device 12 may be a plurality of types of photosensitive devices 12, such as photodiodes, photosensitive complementary metal oxide semiconductor (photosensitive CMOS), or light guiding thin film transistors (light guiding TFTs).

Specifically, the projection display device 10 further comprises a control module 13 electrically connected to the display screen body 11 and the photosensitive device 12 to receive the photosensitive signal, and to determine a projection position of the projection light beam on the projection display device 10 and control a section of the display screen body 11 corresponding to the projection position to be converted from a transparent state to an opaque state according to the photosensitive signal.

It should be noted that the display screen body 11 has a transparent state and an opaque state. When the projection light beam does not irradiate the image displaying part, the display screen body 11 presents a transparent state, and the projection display device 10 can be directly used as transparent glass. When the projection light beam irradiates the image displaying part, the photosensitive device 12 will sense the projection light beam, generate a photogenerated leakage current, and send the photogenerated leakage current to the control module 13 as a photosensitive signal, and the control module 13 will send a control signal to the display screen body 11 and control a section on the display screen body 11 corresponding to the projection light beam to be converted from a transparent state to an opaque state, which enhances light reflectivity of the section on the display screen body 11 corresponding to the projection position, thereby enhancing clarity and brightness of images displayed by the projection light beam on the projection position of the image displaying part.

It should be noted that when the projection light beam is projected on the image displaying part, the section on the display screen body 11 corresponding to the projection position becomes an opaque state, and at this time, remaining sections on the display screen body 11 may present a transparent state or may present an opaque state, which can be selected according to actual application scenarios of the projection display device 10. For example, when a projection display device 10 is used as a car front window or is installed on the car front window, a projection equipment in a car will project images to be display by a projection light beam 21 on an image displaying part, and at this time, a section on a display screen body 11 corresponding to a projection position will become an opaque state and remaining sections remain a transparent state. At this time, the projection display device 10 can be used as a navigator and enhances clarity and brightness of projected images displayed on the projection display device 10 without affecting a driver's vision, and at the same time, the driver does not need to look down at a navigation route, which is more safe and convenient.

It should be noted that the projection display device 10 can also be used as car side windows and roof windows. When it is necessary to stop outside light from reaching a car, a light beam emitting equipment in the car can emit a light beam on the projection display device 10, at this time, entire surface of the display screen body 11 is converted from a transparent state to an opaque state, and meanwhile the light beam emitting equipment can be a light source in the car to illuminate the car, which is convenient. The projection display device 10 can also be used as windows in a building or indoor projection walls. When the projection display device 10 presents a transparent state, it can be used as transparent glass, while when the projection display device 10 presents an opaque state, it can be used as a projection wall or a light-blocking layer.

Specifically, as shown in FIG. 2, the display screen body 11 comprises a first transparent substrate 111 and a second transparent substrate 112 disposed opposite to the first transparent substrate 111, a switch device layer 113 and a first electrode 114 are stacked on one side of the first transparent substrate 111 adjacent to the second transparent substrate 112 in sequence, a second electrode 115 is disposed on one side of the second transparent substrate 112 adjacent to the first transparent substrate 111, and a liquid crystal layer 116 is disposed between the first electrode 114 and the second electrode 115.

Wherein, the switch device layer 113 comprises a switch device electrically connected to the first electrode 114, and the control module 13 is electrically connected to the switch device and controls the switch device to be turned on when receiving the photosensitive signal.

It should be noted that liquid crystals in the liquid crystal layer 116 may be polymer network liquid crystals (PNLCs, polymer liquid crystals), the first electrode 114 is connected to a power supply of the projection display device 10, and the second electrode 115 is grounded or connected to a reference voltage. When the projection light beam irradiates the image displaying part, the photosensitive device 12 will send an optical signal to the control module 13 to control the switch device to be turned on, allowing the first electrode 114 to be connected to the power supply of the projection display device 10, thereby generating an electric field between the first electrode 114 and the second electrode 115, and the liquid crystals in the liquid crystal layer 116 will rotate under effect of the electric field, thereby making the display screen body 11 be converted from a transparent state to an opaque state.

It should be noted that a disposed position of the photosensitive device 12 can be selected according to actual applications of the projection display device 10. For example, when the projection display device 10 is used as a projection wall and any position of the image displaying part needs to be able to display, the photosensitive device 12 is disposed on the display screen body 11, and a plurality of photosensitive devices 12 are distributed on entire surface of the display screen body 11 at intervals. At this time, the photosensitive devices 12 may be disposed on the surface of the display screen body 11 or in the display screen body 11. When the projection display device 10 is used as devices such as a light-blocking layer, the photosensitive device 12 can be disposed on the display screen body 11 or outside of the display screen body 11. When the photosensitive device 12 is disposed on the display screen body 11, it can only be disposed on a predetermined area to save production cost, and the projection light beam projected to the predetermined area of the display screen body 11 can make all areas of the display screen body 11 change from a transparent state to an opaque state.

Specifically, photosensitivity of the photosensitive device 12 is less than a default value.

It should be noted that the greater the photosensitivity of the photosensitive device 12 is, the more sensitive to light it is. An intensity of a light beam emitted by an ordinary small projector 20 and other light beam emitting devices is about 2000 lux, while an intensity of indoor lighting and ambient light is about 400 lux. Through designing the photosensitivity of the photosensitive device 12, the photosensitivity of the photosensitive device 12 can be reduced, thereby preventing the indoor lighting and ambient light from causing the projection display device 10 to malfunction. The default value can be selected according to actual application scenarios of the projection display device 10.

Specifically, the projection display device 10 further comprises a transparent glass part 14 connected to the image displaying part.

In an embodiment, the image displaying part is integrally formed with the transparent glass part 14.

In another embodiment, the image displaying part is embedded in the transparent glass part 14.

Specifically, a thickness of the image displaying part is less than or equal to a thickness of the transparent glass part 14.

In an embodiment of the present disclosure, a first polarizer 117 is disposed on one side of the first transparent substrate 111 away from the second transparent substrate 112, a second polarizer 118 is disposed on one side of the second transparent substrate 112 away from the first transparent substrate 111, and a polarization direction of the first polarizer 117 is parallel to a polarization direction of the second polarizer 118.

It should be noted that when the projection display device 10 is used as transparent glass, light can pass through the image displaying part, while when the projection display device 10 is used as a projection wall or a light-blocking layer, after the liquid crystals in the liquid crystal layer 116 rotate, due to existence of the first polarizer 117 and the second polarizer 118, ambient light cannot pass through the image displaying part, thereby making images projected on the image displaying part clearer.

Figure 4:
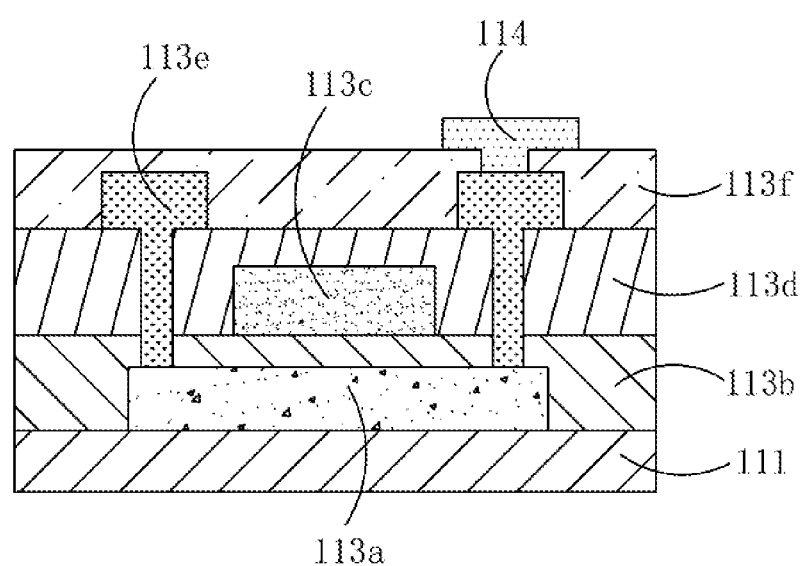
FIG. 4 is a schematic structural diagram of a switch device layer according to an embodiment of the present disclosure.

In an embodiment of the present disclosure, as shown in FIG. 4, the switch device layer 113 comprises a semiconductor layer 113a disposed on the first transparent substrate 111, a gate insulating layer 113b covering the semiconductor layer 113a, a gate electrode 113c disposed on the gate insulating layer 113b, an interlayer insulating layer 113d covering the gate electrode 113c, source and drain electrodes 113e disposed on the interlayer insulating layer 113d and electrically connected to the semiconductor layer 113a, and a passivation layer 113f covering the source and drain electrodes 113e. The first electrode 114 is disposed on the passivation layer 113f and is electrically connected to the source and drain electrodes 113e.

Wherein, the switch device includes the semiconductor layer 113a, the gate electrode 113c, and the source and drain electrodes 113e.

Wherein, the semiconductor layer 113a is made of a transparent semiconductor material, such as hydrogenated amorphous silicon or indium gallium zinc oxide. The gate insulating layer 113b, the interlayer insulating layer 113d, and the passivation layer 113f may all be made of transparent organic or transparent inorganic materials, such as silicon oxide and silicon nitride. The gate electrode 113c, the source and drain electrodes 113e, the first electrode 114, and the second electrode 115 are all made of a transparent conductive material, such as indium tin oxide.

Figure 5:
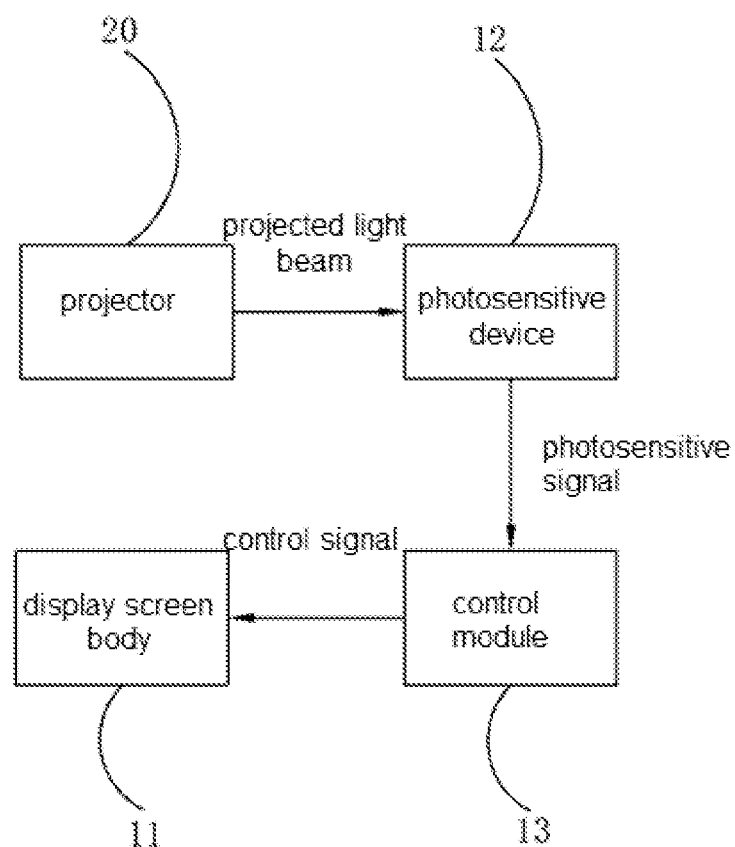
FIG. 5 is a schematic module composition diagram of a projection display equipment according to an embodiment of the present disclosure.
Figure 6:
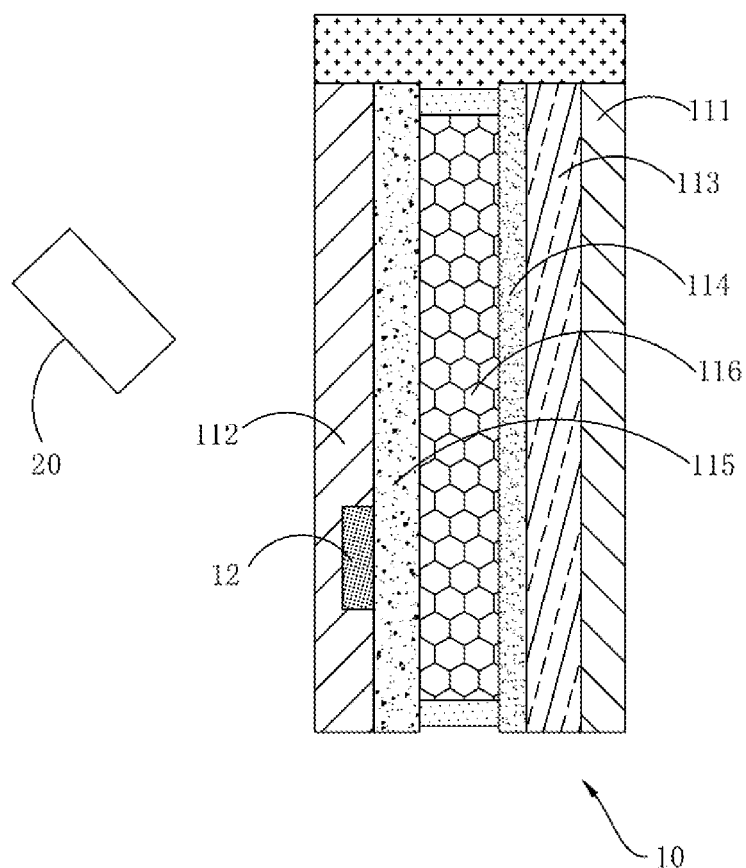
FIG. 6 is a schematic structural diagram of a projection display equipment according to an embodiment of the present disclosure.
Figure 7:
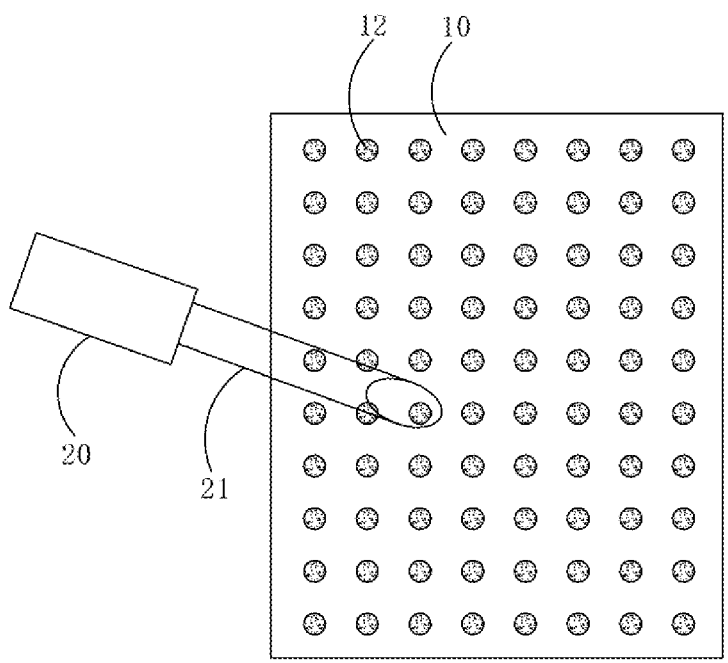
FIG. 7 is a schematic diagram of a projection light beam emitted by a projector projecting on a projection display device according to an embodiment of the present disclosure.

Based on the above projection display device 10, the present disclosure further provides a projection display equipment. As shown in FIGS. 5 to 7, the projection display equipment comprises a projector 20 and the projection display device 10 described in any one of the above embodiments.

Wherein, the projection display device 10 comprises an image displaying part, and the projector 20 emits a projection light beam 21 for displaying on the image displaying part.

Specifically, the image displaying part includes a display screen body 11 and a photosensitive device 12 configured to sense a projection light beam 21 projected on the image displaying part, and the photosensitive device 12 outputs a photosensitive signal when sensing the projection light beam 21.

Wherein, the image displaying part further comprises a control module 13 electrically connected to the display screen body 11 and the photosensitive device 12 to receive the photosensitive signal, and to determine a projection position of the projection light beam 21 on the image displaying part and control a section of the display screen body 11 corresponding to the projection position to be converted from a transparent state to an opaque state according to the photosensitive signal.

When the photosensitive device 12 on the image displaying part receives the projection light beam 21 projected by the projector 20, the photosensitive device 12 will generate a photogenerated leakage current and send the photogenerated leakage current to the control module 13 as a photosensitive signal, and the control module 13 will send a control signal to the display screen body 11 and control a section on the display screen body 11 corresponding to the projection light beam to be converted to an opaque state, which enhances light reflectivity of the section on the display screen body 11 corresponding to the projection position, thereby enhancing clarity and brightness of images projected by the projector 20 on the projection display device 10.

Specifically, the display screen body 11 comprises a first transparent substrate 111 and a second transparent substrate 112 disposed opposite to the first transparent substrate 111, a switch device layer 113 and a first electrode 114 are stacked on one side of the first transparent substrate 111 adjacent to the second transparent substrate 112 in sequence, a second electrode 115 is disposed on one side of the second transparent substrate 112 adjacent to the first transparent substrate 111, and a liquid crystal layer 116 is disposed between the first electrode 114 and the second electrode 115.

Wherein, the switch device layer 113 comprises a switch device electrically connected to the first electrode 114, and the control module 13 is electrically connected to the switch device and controls the switch device to be turned on when receiving the photosensitive signal.

Specifically, the photosensitive device 12 is disposed on one side of the liquid crystal layer 116 adjacent to the projector 20.

It should be noted that when the photosensitive device 12 senses the projection light beam 21, the control module 13 will control the section on the display screen body 11 corresponding to the projection position to be converted from a transparent state to an opaque state, and the photosensitive device 12 is disposed on the side of the liquid crystal layer 116 adjacent to the projector 20, thereby ensuring the photosensitive device 12 to continuously sense the projection light beam 21 emitted by the projector 20. Therefore, the photosensitive device 12 is allowed to continuously sense the projection light beam 21 emitted by the projector 20 during continuous operation of the projector 20.

Specifically, photosensitivity of the photosensitive device 12 is less than a default value.

It should be noted that the greater the photosensitivity of the photosensitive device 12 is, the more sensitive to light it is. An intensity of a light beam emitted by an ordinary small projector 20 and other light beam emitting devices is about 2000 lux, while an intensity of indoor lighting and ambient light is about 400 lux. Through designing the photosensitivity of the photosensitive device 12, the photosensitivity of the photosensitive device 12 can be reduced, thereby preventing the indoor lighting and ambient light from causing the projection display device 10 to malfunction. The default value can be selected according to actual application scenarios of the projection display device 10.

The beneficial effect of the present disclosure is that: the display screen body 11 has a transparent state and an opaque state. When a photosensitive device 12 does not sense a projection light beam, the display screen body 11 presents a transparent state, and the projection display device 10 can be directly used as transparent glass. When the projection light beam irradiates an image displaying part, the photosensitive device 12 will sense the projection light beam, generate a photogenerated leakage current, and send the photogenerated leakage current to a control module 13 as a photosensitive signal, and the control module 13 controls a section on the display screen body 11 corresponding to a projection position to be converted to an opaque state, which enhances light reflectivity of the section on the image displaying part corresponding to the projection position, thereby enhancing clarity and brightness of images displayed by the projection light beam on the projection display device 10.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A projection display device, comprising:
an image displaying part comprising a display screen body and a photosensitive device configured to sense a projection light beam projected on the projection display device, wherein the photosensitive device outputs a photosensitive signal when sensing the projection light beam;
a transparent glass part connected to the image displaying part; and
a control module electrically connected to the display screen body and the photosensitive device to receive the photosensitive signal, and to determine a projection position of the projection light beam on the projection display device and control a section of the display screen body corresponding to the projection position to be converted from a transparent state to an opaque state according to the photosensitive signal;
wherein the display screen body comprises a first transparent substrate and a second transparent substrate disposed opposite to the first transparent substrate, a switch device layer and a first electrode are stacked on one side of the first transparent substrate adjacent to the second transparent substrate in sequence, a second electrode is disposed on one side of the second transparent substrate adjacent to the first transparent substrate, and a liquid crystal layer is disposed between the first electrode and the second electrode;
wherein the switch device layer comprises a switch device electrically connected to the first electrode, and the control module is electrically connected to the switch device and controls the switch device to be turned on when receiving the photosensitive signal; wherein the transparent glass part is connected to the first transparent substrate, the second transparent substrate, the first electrode, and the second electrode, but not directly connected to the liquid crystal layer.

2. The projection display device according to claim 1, wherein photosensitivity of the photosensitive device is less than a default value.

3. The projection display device according to claim 1, wherein the image displaying part is integrally formed with the transparent glass part.

4. The projection display device according to claim 1, wherein the image displaying part is embedded in the transparent glass part.

5. A projection display equipment, comprising a projector and a projection display device, wherein the projection display device comprises an image displaying part comprising a display screen body and a photosensitive device configured to sense a projection light beam projected on the image displaying part and a transparent glass part connected to the image displaying part, and the photosensitive device outputs a photosensitive signal when sensing the projection light beam;
wherein the image displaying part further comprises a control module electrically connected to the display screen body and the photosensitive device to receive the photosensitive signal, and to determine a projection position of the projection light beam on the image displaying part and control a section of the display screen body corresponding to the projection position to be converted from a transparent state to an opaque state according to the photosensitive signal;
wherein the display screen body comprises a first transparent substrate and a second transparent substrate disposed opposite to the first transparent substrate, a switch device layer and a first electrode are stacked on one side of the first transparent substrate adjacent to the second transparent substrate in sequence, a second electrode is disposed on one side of the second transparent substrate adjacent to the first transparent substrate, and a liquid crystal layer is disposed between the first electrode and the second electrode;
wherein the switch device layer comprises a switch device electrically connected to the first electrode, and the control module is electrically connected to the switch device and controls the switch device to be turned on when receiving the photosensitive signal; wherein the transparent glass part is connected to the first transparent substrate, the second transparent substrate, the first electrode, and the second electrode, and the second electrode, but not directly connected to the liquid crystal layer.

6. The projection display equipment according to claim 5, wherein the photosensitive device is disposed on one side of the liquid crystal layer adjacent to the projector.

7. The projection display equipment according to claim 5, wherein photosensitivity of the photosensitive device is less than a default value.

8. The projection display equipment according to claim 5, wherein the image displaying part is integrally formed with the transparent glass part.

9. The projection display equipment according to claim 5, wherein the image displaying part is embedded in the transparent glass part.

10. A projection display device, comprising:
an image displaying part comprising a display screen body and a photosensitive device configured to sense a projection light beam projected on the projection display device, wherein the photosensitive device outputs a photosensitive signal when sensing the projection light beam;
a control module electrically connected to the display screen body and the photosensitive device to receive the photosensitive signal, and to determine a projection position of the projection light beam on the projection display device and control a section on the display screen body corresponding to the projection position to be converted from a transparent state to an opaque state according to the photosensitive signal; and
a transparent glass part connected to the image displaying part, wherein a thickness of the image displaying part is less than or equal to a thickness of the transparent glass part;
wherein the display screen body comprises a first transparent substrate and a second transparent substrate disposed opposite to the first transparent substrate, a switch device layer and a first electrode are stacked on one side of the first transparent substrate adjacent to the second transparent substrate in sequence, a second electrode is disposed on one side of the second transparent substrate adjacent to the first transparent substrate, and a liquid crystal layer is disposed between the first electrode and the second electrode;
wherein the switch device layer comprises a switch device electrically connected to the first electrode, and the control module is electrically connected to the switch device and controls the switch device to be turned on when receiving the photosensitive signal; wherein the transparent glass part is connected to the first transparent substrate, the second transparent substrate, the first electrode, and the second electrode, and the second electrode, but not directly connected to the liquid crystal layer.

11. The projection display device according to claim 10, wherein photosensitivity of the photosensitive device is less than a default value.

12. The projection display device according to claim 10, wherein the image displaying part is integrally formed with the transparent glass part.

13. The projection display device according to claim 10, wherein the image displaying part is embedded in the transparent glass part.

14. The projection display device according to claim 10, wherein liquid crystals in the liquid crystal layer are polymer liquid crystals.

15. The projection display device according to claim 10, wherein a first polarizer is disposed on one side of the first transparent substrate away from the second transparent substrate, a second polarizer is disposed on one side of the second transparent substrate away from the first transparent substrate, and a polarization direction of the first polarizer is parallel to a polarization direction of the second polarizer.

* * * * *